(12) United States Patent
Liu

(10) Patent No.: US 8,382,149 B1
(45) Date of Patent: Feb. 26, 2013

(54) BABY TRAILER FRAME MOUNTING STRUCTURE

(76) Inventor: Cheh-Kang Liu, Taipei (TW)

( * ) Notice: Subject to any disclaimer, the term of this patent is extended or adjusted under 35 U.S.C. 154(b) by 148 days.

(21) Appl. No.: 13/164,845

(22) Filed: Jun. 21, 2011

(51) Int. Cl.
*B62B 7/00* (2006.01)
(52) U.S. Cl. ........ 280/642; 280/647; 280/650; 280/657; 280/658; 280/47.38
(58) Field of Classification Search .......... 280/642–644, 280/647–650, 657–658, 47.38–47.41
See application file for complete search history.

(56) References Cited

U.S. PATENT DOCUMENTS

| | | | | |
|---|---|---|---|---|
| 4,731,899 A * | 3/1988 | Huang | ............................ | 16/35 R |
| 4,759,098 A * | 7/1988 | Ko | ........................................ | 16/29 |
| 4,969,230 A * | 11/1990 | Huang | ................................ | 16/30 |
| 5,014,391 A * | 5/1991 | Schulte | ............................ | 16/35 R |
| 5,172,451 A * | 12/1992 | Chiu | ................................... | 16/35 R |
| 5,975,545 A * | 11/1999 | Hu | ................................ | 280/47.38 |
| 5,988,323 A * | 11/1999 | Chu | ............................... | 188/1.12 |
| 6,735,794 B1 * | 5/2004 | Way et al. | ........................ | 5/86.1 |
| 6,810,560 B1 * | 11/2004 | Tsai | ................................. | 16/35 R |
| 6,880,202 B2 * | 4/2005 | Thompson et al. | ........... | 16/35 R |
| 7,021,651 B2 * | 4/2006 | Lan | ................................ | 280/642 |
| 7,210,690 B2 * | 5/2007 | Tan | ............................. | 280/47.38 |
| 7,377,526 B2 * | 5/2008 | Lan | ................................ | 280/47.38 |
| 7,401,803 B1 * | 7/2008 | Lai | ................................. | 280/647 |
| 7,703,588 B2 * | 4/2010 | Chiang | ....................... | 190/18 A |
| 7,784,151 B2 * | 8/2010 | Chen et al. | ..................... | 16/35 R |
| 8,292,327 B2 * | 10/2012 | Araya Moreno et al. | ..... | 280/771 |
| 2007/0063470 A1 * | 3/2007 | Lan | .............................. | 280/47.38 |
| 2007/0090628 A1 * | 4/2007 | Golias | ............................ | 280/642 |
| 2007/0246915 A1 * | 10/2007 | Madigan et al. | .............. | 280/642 |
| 2008/0042383 A1 * | 2/2008 | Hu | .............................. | 280/47.38 |
| 2008/0054601 A1 * | 3/2008 | Li | .................................. | 280/642 |
| 2008/0073879 A1 * | 3/2008 | Chen et al. | ..................... | 280/642 |
| 2008/0088116 A1 * | 4/2008 | Den Boer | ....................... | 280/650 |
| 2008/0179848 A1 * | 7/2008 | Lake | ........................... | 280/47.41 |
| 2008/0211206 A1 * | 9/2008 | Thorne et al. | .................. | 280/650 |
| 2008/0284137 A1 * | 11/2008 | Popp | ............................. | 280/647 |
| 2008/0315562 A1 * | 12/2008 | Song et al. | ..................... | 280/650 |
| 2009/0079159 A1 * | 3/2009 | Every | .......................... | 280/250.1 |
| 2009/0115151 A1 * | 5/2009 | Van Dijk | .................... | 280/47.38 |
| 2009/0127828 A1 * | 5/2009 | Longenecker et al. | ........ | 280/650 |
| 2009/0194973 A1 * | 8/2009 | Wang | ............................. | 280/642 |
| 2009/0278335 A1 * | 11/2009 | Dotsey | .......................... | 280/647 |
| 2009/0309335 A1 * | 12/2009 | Van Dijk | ....................... | 280/642 |
| 2010/0001492 A1 * | 1/2010 | Driessen | ....................... | 280/642 |
| 2010/0013195 A1 * | 1/2010 | Hsu | ................................. | 280/642 |
| 2010/0025968 A1 * | 2/2010 | Fritz et al. | ..................... | 280/647 |
| 2012/0080251 A1 * | 4/2012 | Ohashi | ........................ | 180/65.31 |

* cited by examiner

*Primary Examiner* — Jeffrey J Restifo
*Assistant Examiner* — Erez Gurari
(74) *Attorney, Agent, or Firm* — Jackson IPG PLLC

(57) ABSTRACT

A baby trailer frame mounting structure includes a bottom frame unit, a top frame unit, a trailer bar, two front wheel holder mounting frame assemblies and two front wheel holders. Each front wheel holder mounting frame assembly includes a base frame block affixed to one sidebar or front bar of the bottom frame unit, and a spring-loaded control member pivotally coupled to the base frame block for locking the associating front wheel holder.

9 Claims, 16 Drawing Sheets

BABY TRAILER FRAME MOUNTING STRUCTURE

BACKGROUND OF THE INVENTION

1. Field of the Invention

The present invention relates to a baby trailer and more particularly, to a baby trailer frame mounting structure, which consists of a lower number of component parts and uses a control member to match with spring members for locking the front wheel holder, facilitating quick mounting and dismounting of the front wheel holder.

2. Description of the Related Art

FIG. 1 illustrates the frame structure of a conventional baby trailer. The baby trailer 4 comprises a base frame 44, two rear wheels 41 respectively and pivotally mounted on two opposite sidebars 441 of the base frame 44, a trailer bar 42 connected to one sidebar 441 and forwardly protruding over the front bar 442 of the base frame 44, and connectable to a bicycle, a front wheel holder mounting frame assembly 43 located on the front side of the trailer bar 42, a front wheel holder 45 coupled to the front wheel holder mounting frame assembly 43 and pivotally holding a pair of front wheels 451. According to this design, a special hand tool is necessary when connecting the front wheel holder 45 to the front wheel holder mounting frame assembly 43 or dismounting the front wheel holder 45 from the front wheel holder mounting frame assembly 43.

FIGS. 2-5 illustrate another front wheel holder mounting frame assembly for securing a front wheel holder to a baby trailer according to the prior art. According to this design, the front wheel holder mounting frame assembly 3 consists of a first frame block 31, a second frame block 32, a spring holder 33, two spring members 34 and a control member 35. The first frame block 31 and the second frame block 32 are attached together and affixed to one sidebar of the base frame unit of the frame structure of the baby trailer with 6 pcs of fastening members 36. This design of front wheel holder mounting frame assembly has drawbacks as follows:

1. During installation, the spring members 34 are respectively attached to respective support rods 330 of the spring holder 33, and then the coupling hole, referenced by 331, of the spring holder 33 is coupled to a locating block 321 of the second frame block 32, and then hold the spring holder 33 in an inclined position and attach two stop faces 351 of the control member 35 against respective distal ends 341 of the spring members 34 to move a stop plate 352 of the control member 35 over a locating plate 322 of the second frame block 32 and then force the control member 35 downwards into position (see FIG. 4). When forcing the control member 35 against the spring members 34 in a rush during installation, the spring members 34 may be forced to jump away, complicating the installation operation. After installation of the control member 35 with the spring holder 33 and the spring members 34 in the second frame block 32, a positioning hole 320 of the second frame block 32 is coupled to one sidebar of the base frame unit of the baby trailer, and then the first frame block 31 is attached to the same sidebar of the base frame unit of the baby trailer and affixed with the second frame block 32 to the sidebar of the base frame unit of the baby trailer with the fastening members 36. This installation procedure is complicated, wasting much installation labor and time.
2. Fabrication of the first frame block 31, the second frame block 32, the spring holder 33 and the control member 35 is complicated and requires different molds, increasing the manufacturing and inventory cost.
3. The first frame block 31 and the second frame block 32 each have a big size, wasting much packing material and requiring much storage and delivery space.

SUMMARY OF THE INVENTION

The present invention has been accomplished under the circumstances in view. It is one object of the present invention to provide a baby trailer frame mounting structure, which facilitates quick mounting and dismounting of front wheel holders.

According to one aspect of the present invention, a baby trailer frame mounting structure comprises a bottom frame unit, a top frame unit, a trailer bar, two front wheel holder mounting frame assemblies and two front wheel holders. Each front wheel holder mounting frame assembly includes a base frame block affixed to one sidebar or front bar of the bottom frame unit, and a spring-loaded control member pivotally coupled to the base frame block for locking the associating front wheel holder.

Further, the base frame block of each front wheel holder mounting frame assembly has a locating groove located on each of two opposite lateral sides thereof for mounting. The design of the locating grooves of the base frame blocks of the front wheel holder mounting frame assemblies facilitates fixation of the front wheel holder mounting frame assemblies to the sidebars or front bar of the bottom frame unit with fastening members. Further, by means of attaching the respective spring members to the support rods of the respective control members and then inserting the respective control members with the respective spring members into the accommodation open chambers of the base frame blocks of the respective front wheel holder mounting assemblies and then pivotally connecting the base frame blocks and the control members to the bottom frame unit with pivot pins, the front wheel holder mounting assemblies are installed in the bottom frame unit with less labor and time.

Further, subject to the arrangement of the base frame blocks, the control members, the spring members, the fastening members and the pivot pins, the front wheel holders can easily and detachably installed in the bottom frame unit of the baby trailer. These component parts are easy and inexpensive to manufacture, saving much the tooling cost.

The small size design of the front wheel holder mounting frame assemblies of the baby trailer frame mounting structure saves much storage and delivery space and cost.

DETAILED DESCRIPTION OF THE INVENTION

Figure 1:
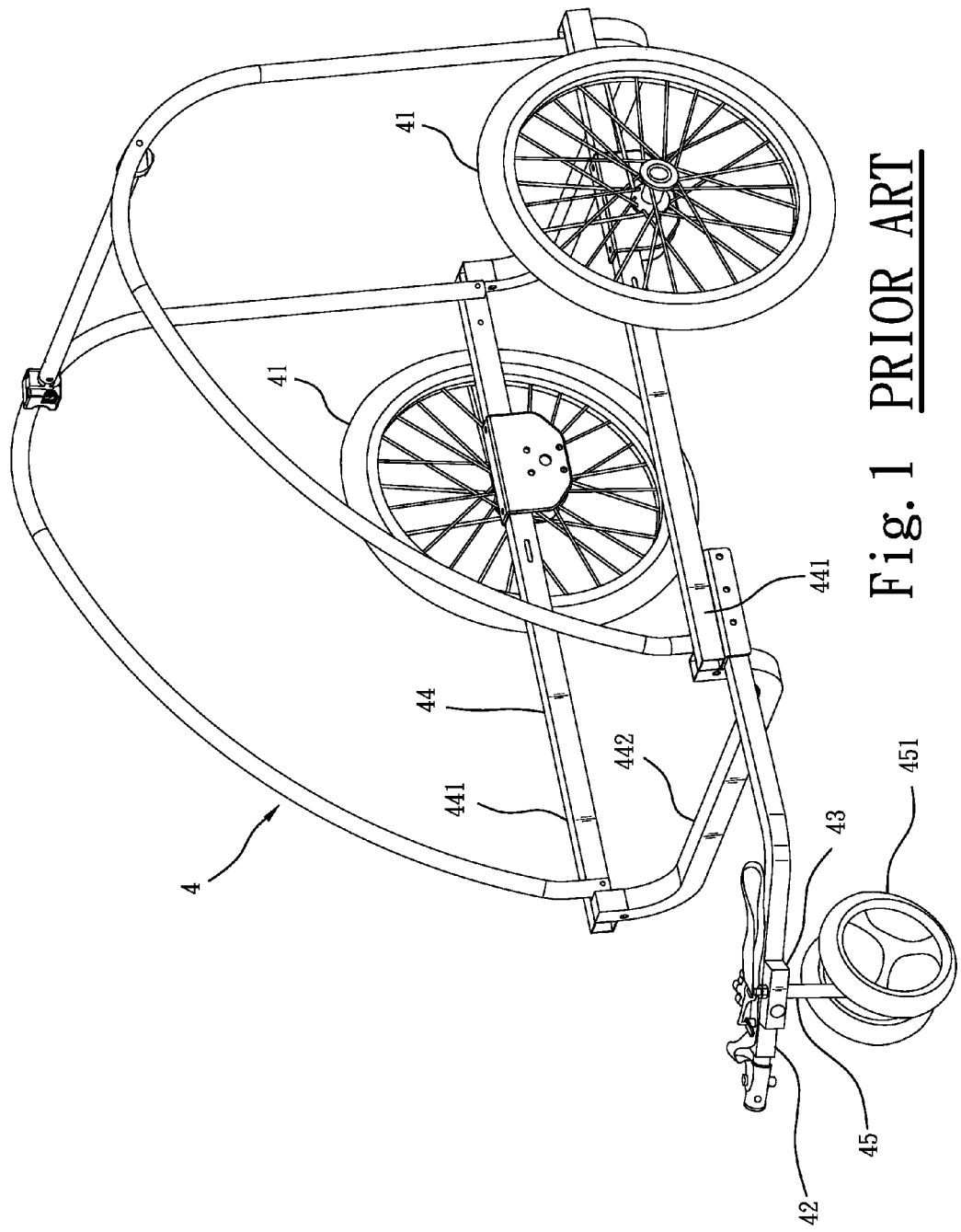
FIG. 1 is perspective view of a frame structure for baby trailer according to the prior art.
Figure 2:
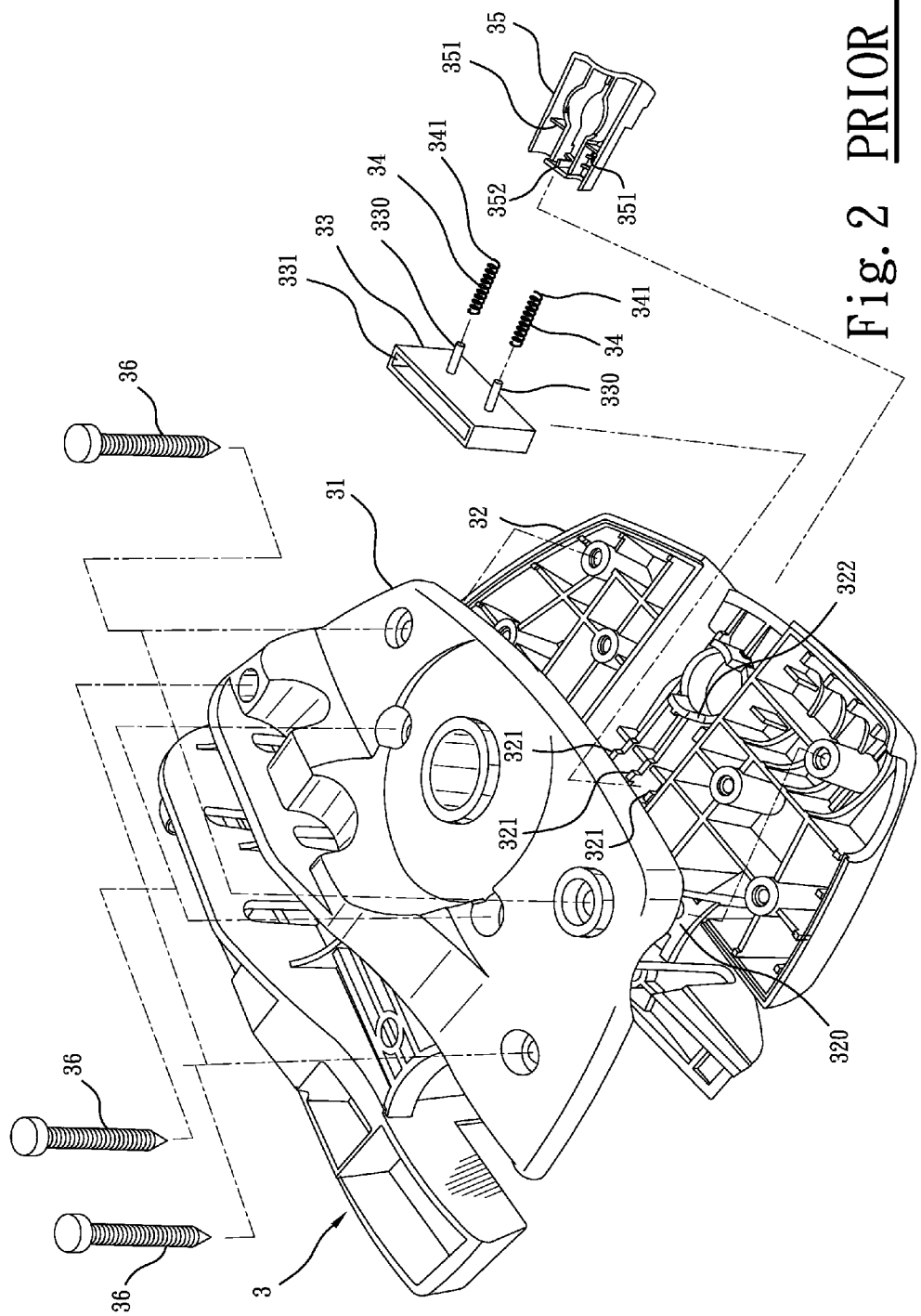
FIG. 2 is an exploded view of a front wheel holder mounting frame assembly of another baby trailer design according to the prior art.
Figure 3:
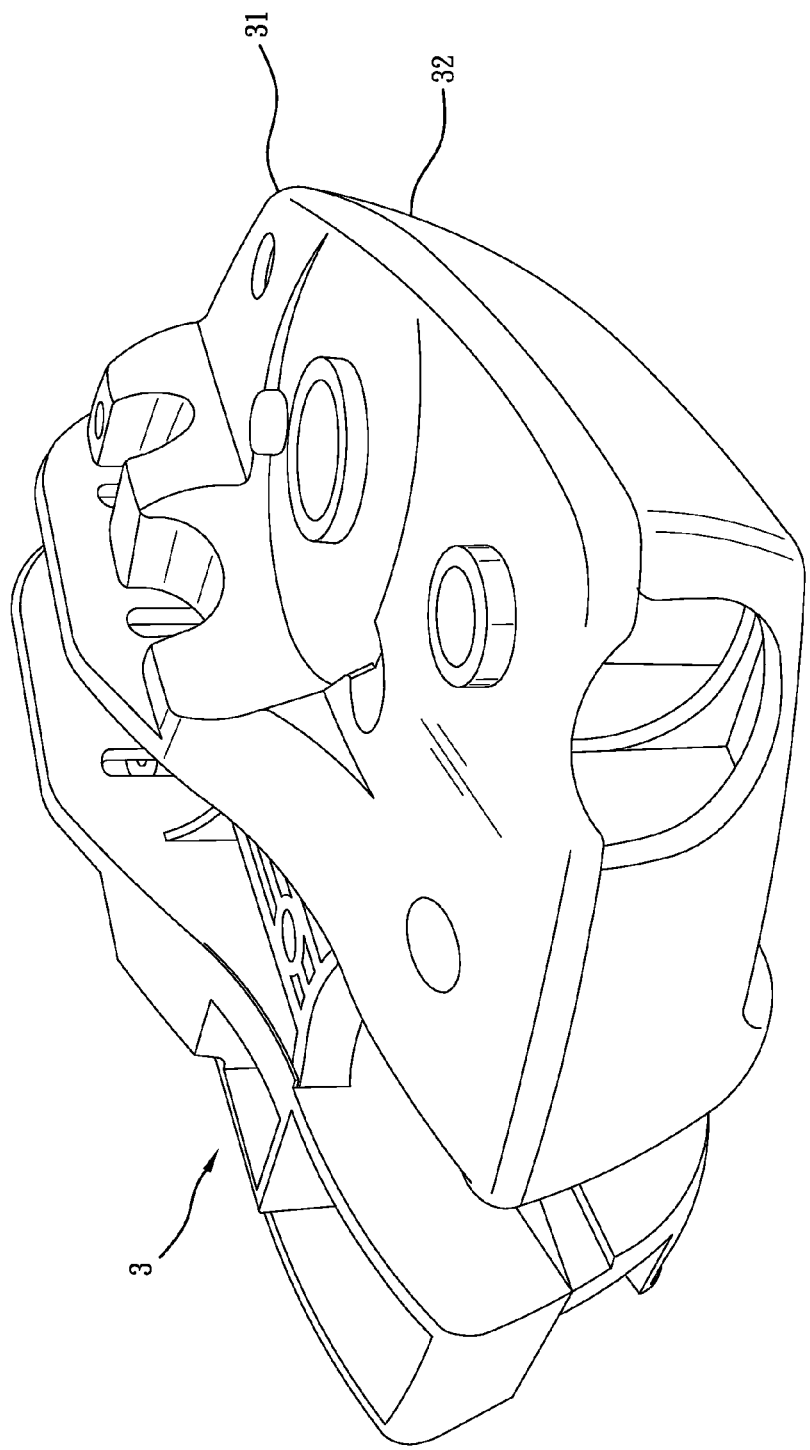
FIG. 3 is an elevational assembly view of FIG. 2.
Figure 4:
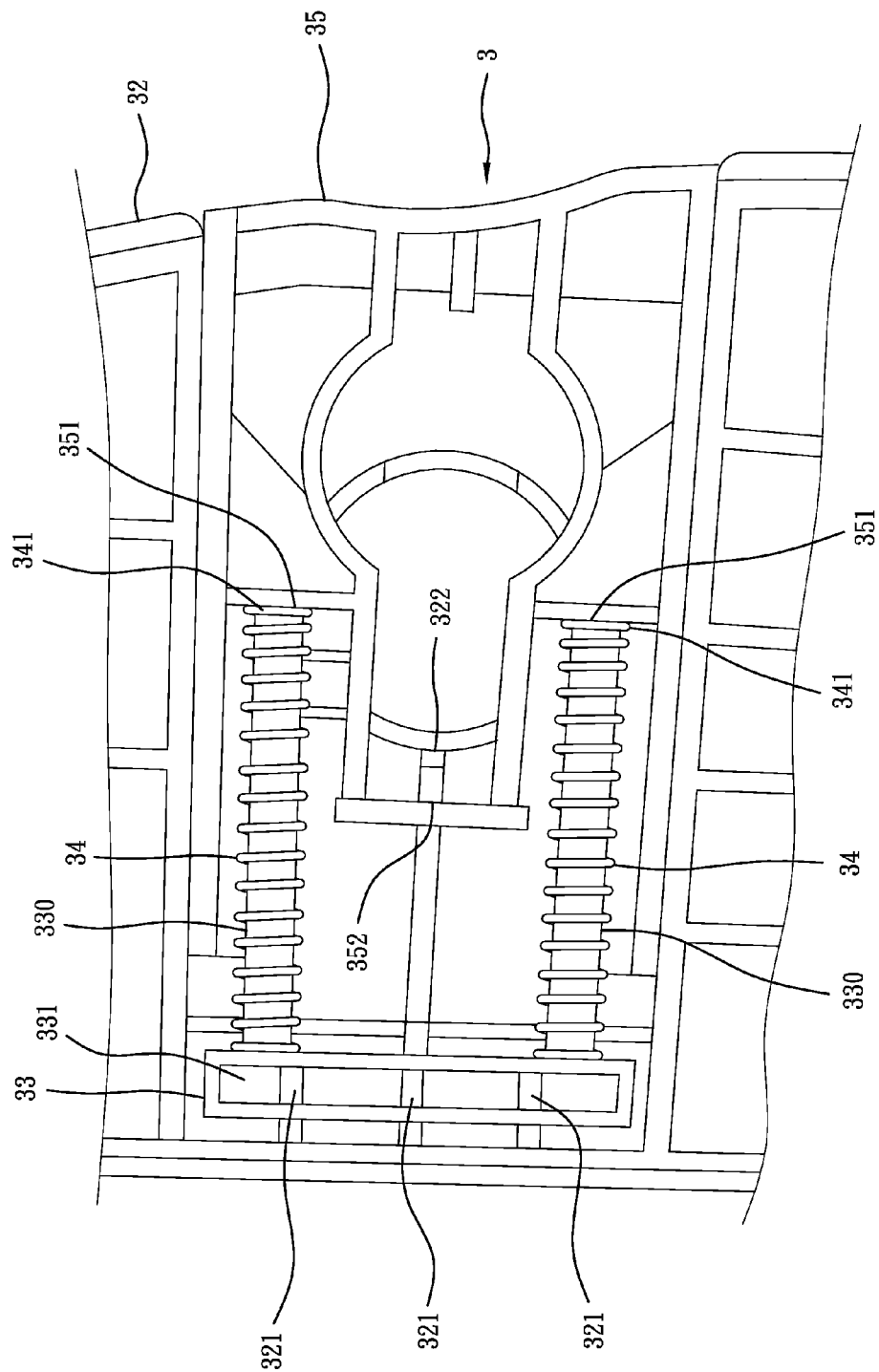
FIG. 4 is a sectional view in an enlarged scale of the assembly of FIG. 3.
Figure 5:
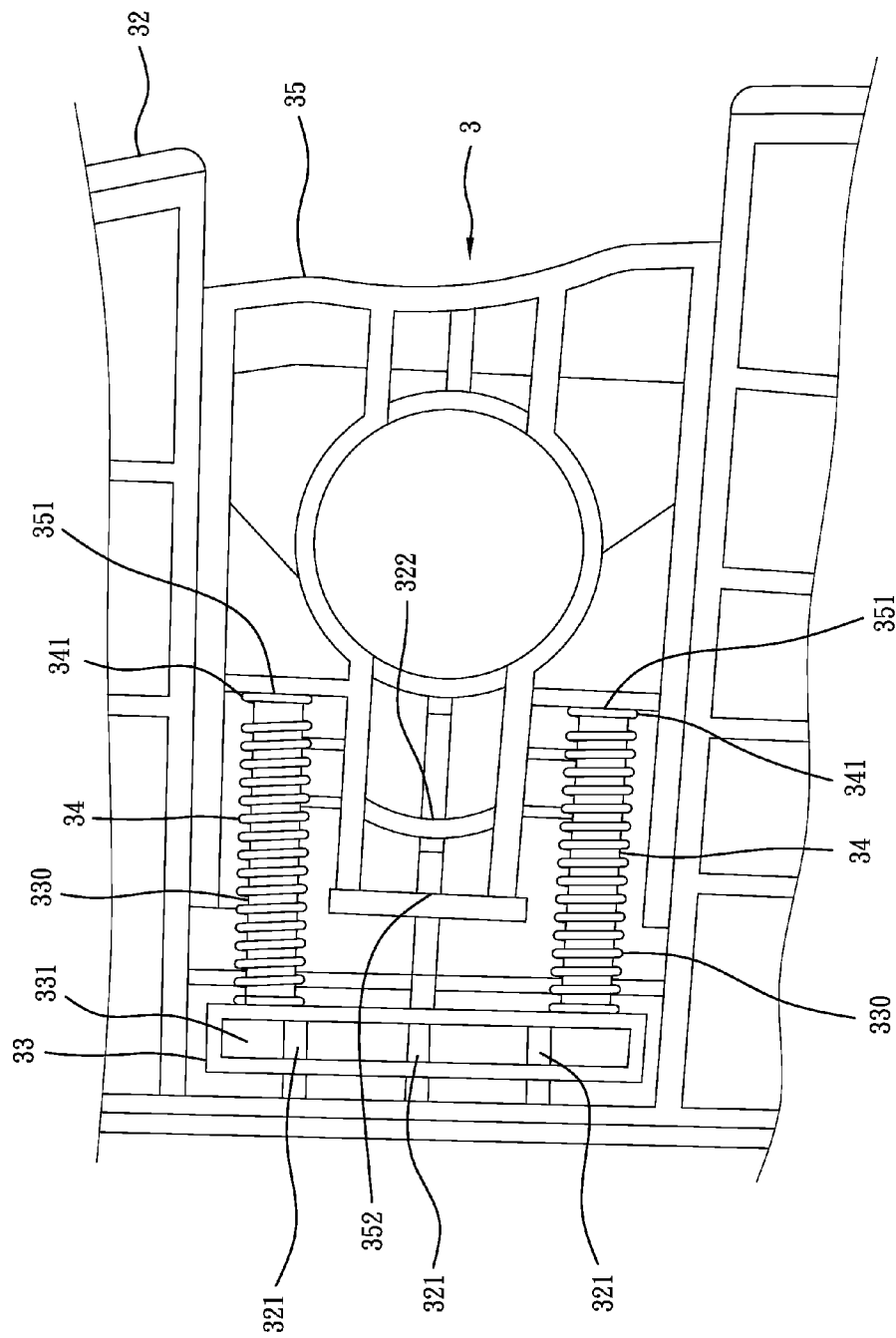
FIG. 5 corresponds to FIG. 4, illustrating the control member pressed.
Figure 6:
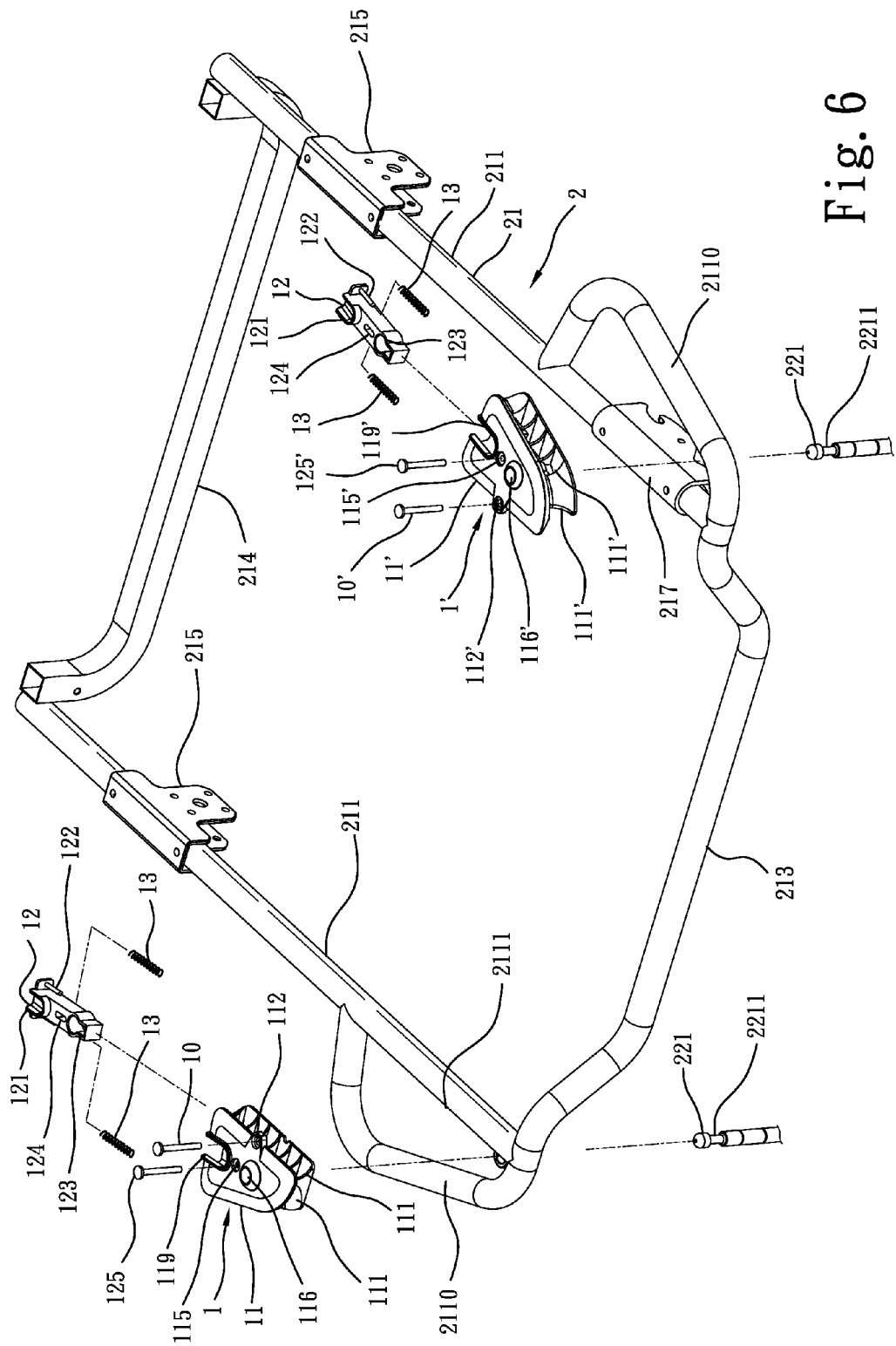
FIG. 6 is an exploded view of a baby trailer frame mounting structure in accordance with the present invention.
Figure 7:
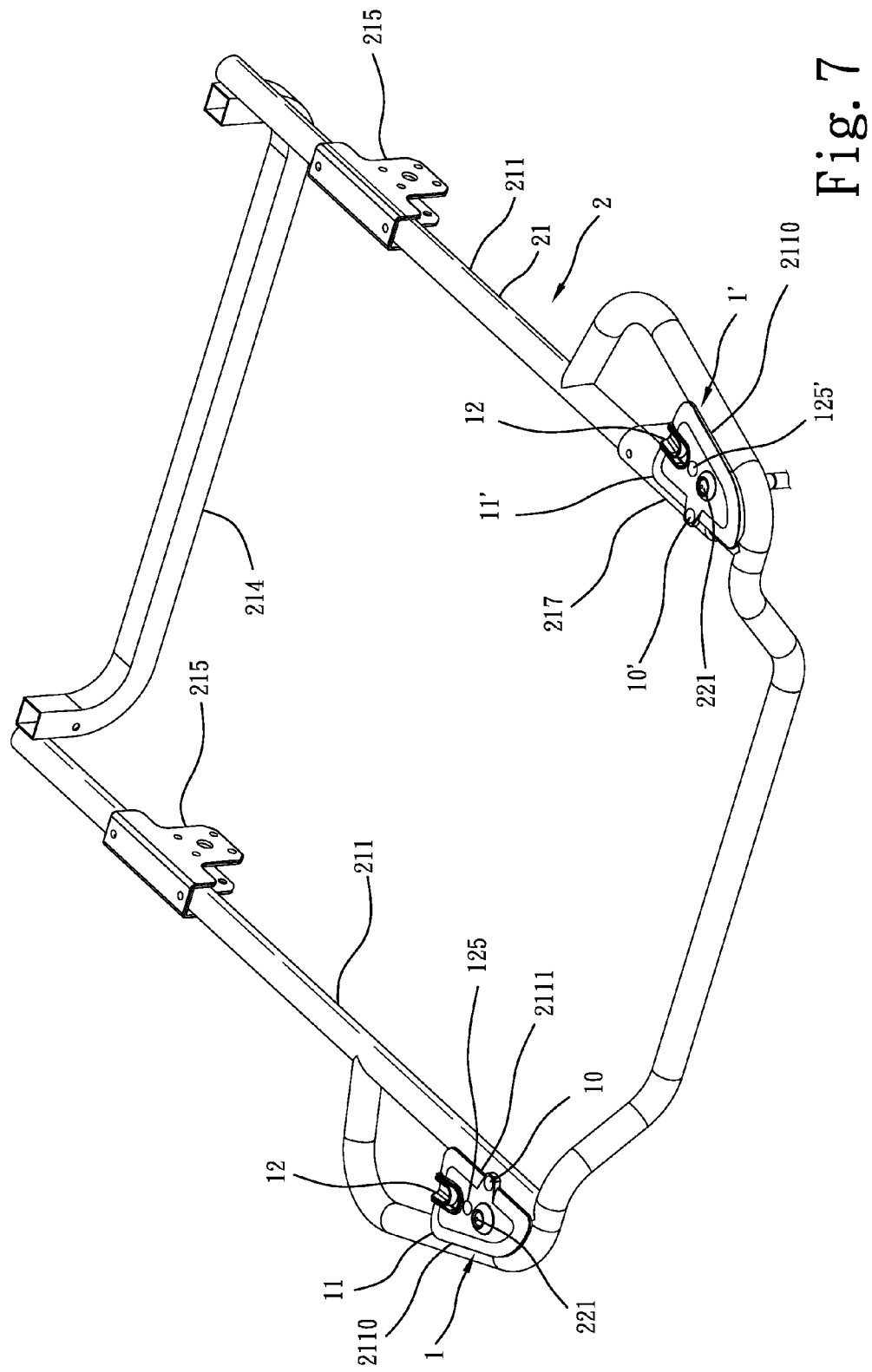
FIG. 7 is an elevational assembly view of FIG. 6.

Referring to FIGS. 6-14, a frame mounting structure of a baby trailer 2 in accordance with the present invention is shown comprising:

a bottom frame unit 21 comprising a front bar 213, a rear bar 214, opposing left and right sidebars 211 connected in parallel between the front bar 213 and the rear bar 214, two sub-sidebars 2110 respectively connected between the sidebars 211 and the front bar 213, two rear wheel holders 215 respectively affixed to the sidebars 211 near the rear bar 214 and adapted to pivotally support one respective rear wheel (not shown), a trailer bar holder 217 affixed to one sidebar 211 near the front bar 213 for the mounting of a trailer bar (not shown);

a top frame unit (not shown) having opposing front and rear ends of opposing left and right sides thereof respectively coupled to the front and rear ends of the left and right sidebars 211 of the bottom frame unit 21;

a trailer bar (not shown) having a rear end pivotally connected to the trailer bar holder 217 of the bottom frame unit 21 and a front end connectable to a rear part of the frame structure of a bicycle;

two front wheel holder mounting frame assemblies 1;1' respectively and selectively connected to the left and right sidebars 211 or the middle part of the front bar 213 of the bottom frame unit 21 for the connection of one respective front wheel holder 22 (see FIG. 7 and FIG. 12); and two front wheel holders 22 each comprising a coupling axle 221 (see FIG. 11) respectively pivotally coupled to the front wheel holder mounting frame assemblies 1;1' and pivotally supporting one respective front wheel 222, the coupling axle 221 having a neck 2211 near the top end thereof.

Subject to the aforesaid arrangement, the baby trailer 2 can be used as a baby cart.

The main features and advantages of the present invention are outlined hereinafter.

The front wheel holder mounting frame assemblies 1;1' each comprises a base frame block 11;11', a control member 12 and at least one, for example, two spring members 13. The base frame block 11;11' comprises a locating groove 111;111' located on each of two opposite lateral sides thereof, a locating hole 112;112' disposed at one lateral side thereof and extending across one locating groove 111;111' and respectively fastened to the sidebars 211 of the bottom frame unit 21 by a respective fastening member 10;10', an accommodation open chamber 114;114' extending to the rear side thereof, a top through hole 115;115' and a top coupling hole 116;116' respectively located on the top side thereof in communication with the accommodation open chamber 114;114' (see FIGS. 8 and 9), a bottom through hole 117;117' and a bottom coupling hole 118;118' respectively located on the bottom side thereof in communication with the accommodation open chamber 114;114', and a locating notch 119;119' located on the top wall and extending to the rear side thereof. The locating grooves 111 of the base frame block 11 of one front wheel holder mounting frame assembly 1 are respectively attached to the outer side 2111 of one (the left) sidebar 211 of the bottom frame unit 21 and the inner side of the associating sub-sidebar 2110 (see FIGS. 6 and 7). The locating grooves 111' of the base frame block 11' of the other front wheel holder mounting frame assembly 1' are respectively attached to the trailer bar holder 217 of the bottom frame unit 21 and the inner side of the associating sub-sidebar 2110.

Figure 8:
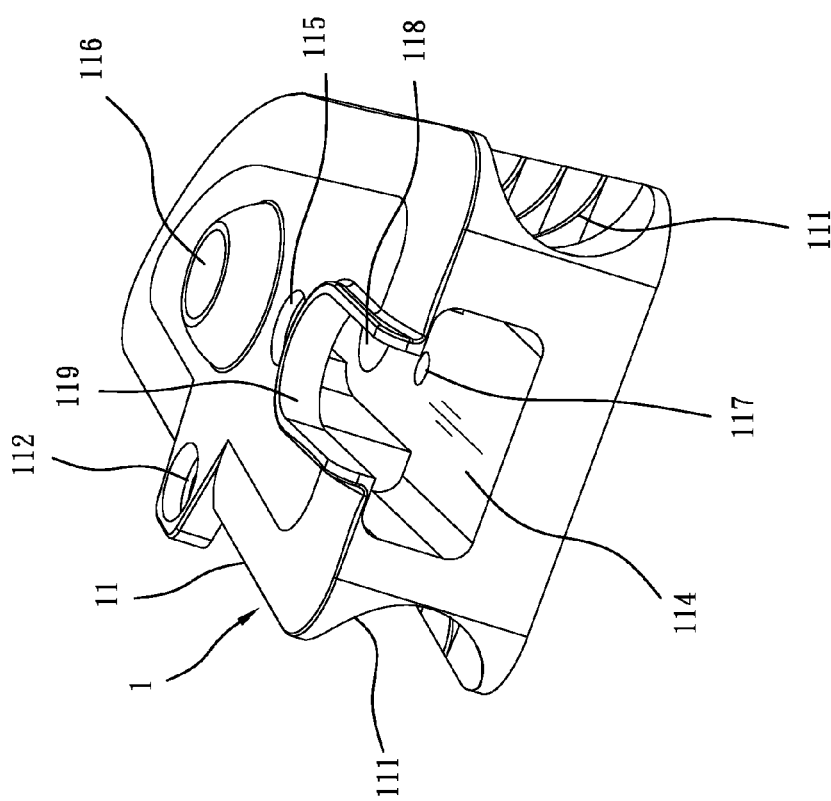
FIG. 8 is an elevational view, in an enlarged scale, of the base frame block of one front wheel holder mounting frame assembly of the baby trailer frame mounting structure in accordance with the present invention.
Figure 9:
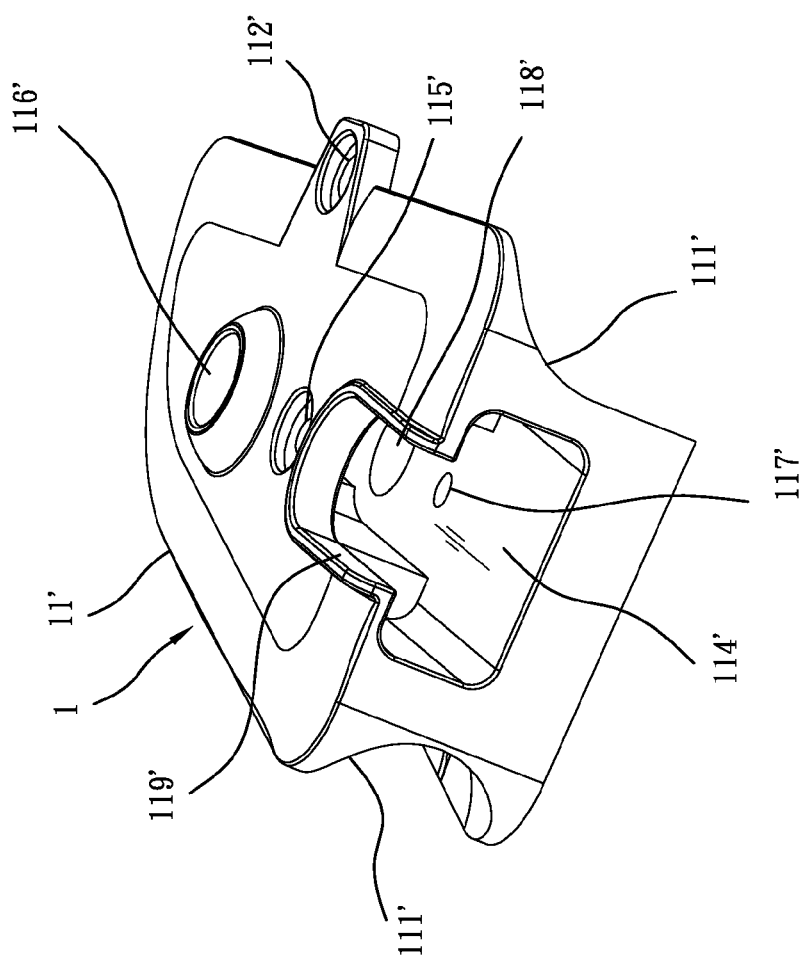
FIG. 9 is an elevational view, in an enlarged scale, of the base frame block of the other front wheel holder mounting frame assembly of the baby trailer frame mounting structure in accordance with the present invention.
Figure 10:
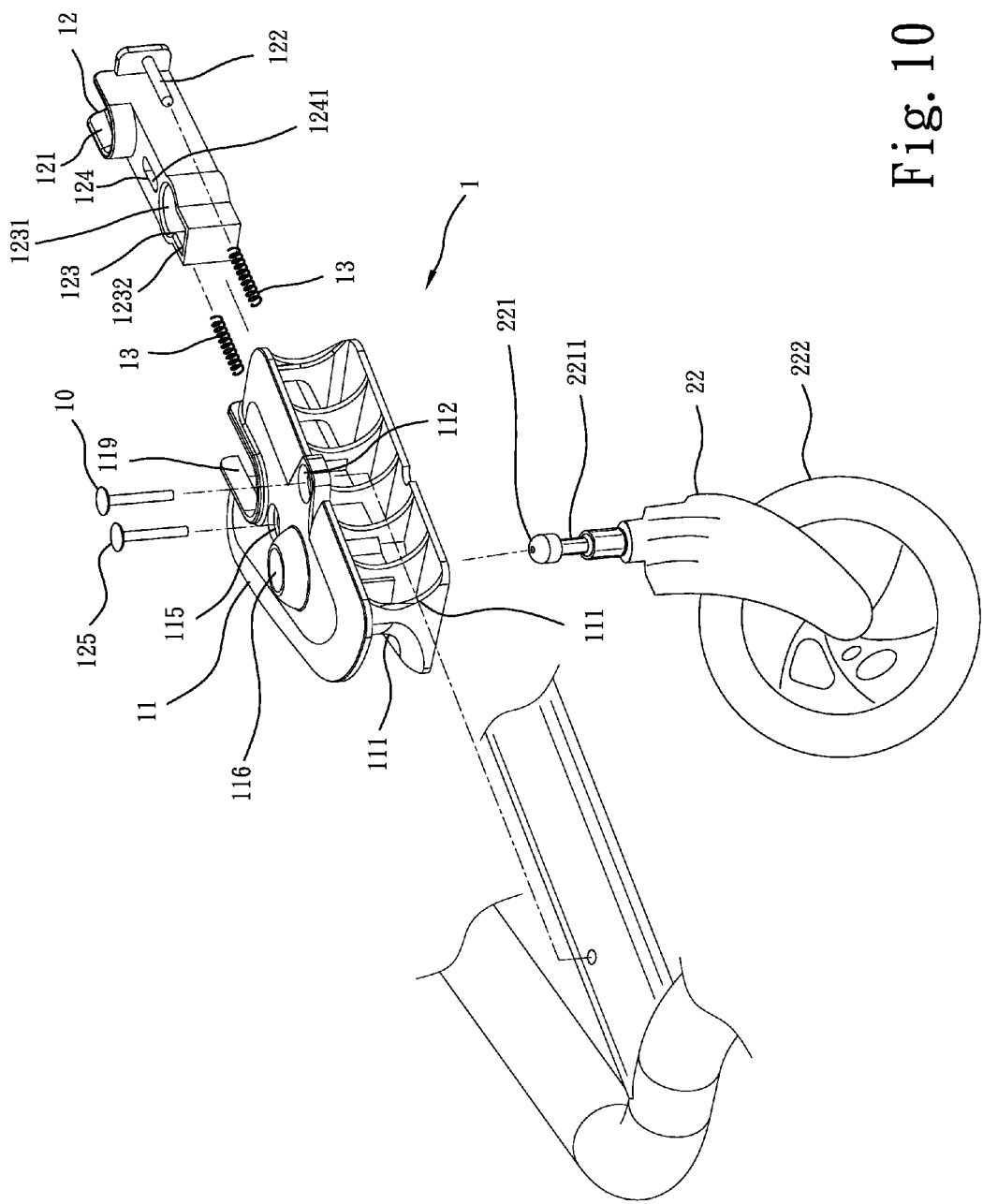
FIG. 10 is an exploded view of a part of the present invention, illustrating the structure of one front wheel holder mounting frame assembly and its relationship relative to the associating front wheel holder.
Figure 11:
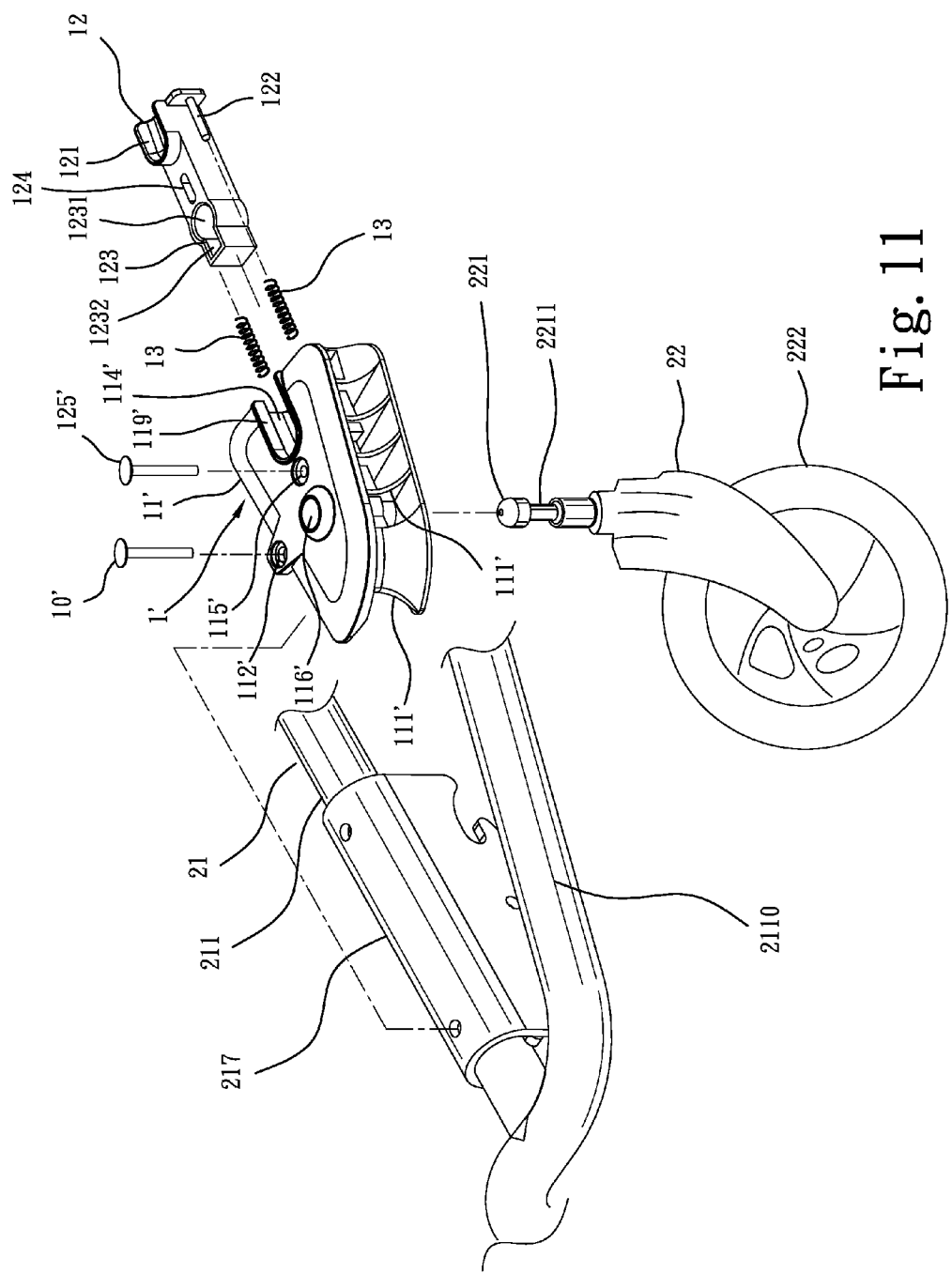
FIG. 11 is an exploded view of a part of the present invention, illustrating the structure of the other front wheel holder mounting frame assembly and its relationship relative to the associating front wheel holder.
Figure 12:
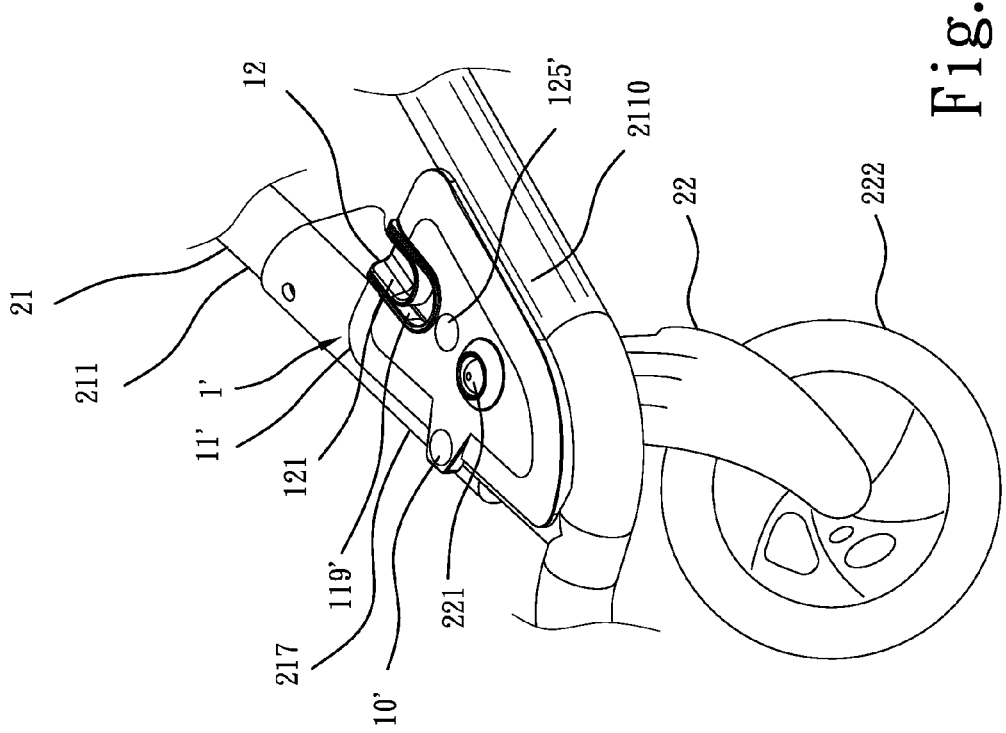
FIG. 12 is an elevational assembly view of FIG. 11.

The control member 12 (see FIG. 11, FIG. 13 and FIG. 14) is inserted into the accommodation open chamber 114;114' of the base frame block 11;11' of the front wheel holder mounting frame assembly 1;1', comprising a rear stop block 121 suspending in the locating notch 119;119', at least one, for example, two support rods 122 disposed at two opposite lateral sides relative to the rear stop block 121 and extending forwards and supporting the respective spring members 13, a positioning hole 123 disposed at a front side thereof, and a sliding slot 124 spaced between the support rods 122 and the positioning hole 123 and coupled to the top through hole 115;115' and bottom through hole 117;117' of the base frame block 11;11' by a pivot pin 125;125' (see FIGS. 8-10). The positioning hole 123 has a big diameter portion 1231 and a small diameter portion 1232. The small diameter portion 1232 is disposed above the second coupling hole of the mud fender (see FIGS. 12 and 14). When the control member 12 is forced forwardly, the spring members 13 are compressed. When the external force is disappeared, the spring members 122 immediately return the control member 12 to its former position. The small diameter portion 1232 is normally suspending below the top coupling hole 116;116'. When the control member 12 is forced forwardly to the position where the rear end 1241 of the sliding slot 124 is stopped by the pivot pin 125;125', the big diameter portion 1231 is kept in axial alignment between the top coupling hole 116;116' and bottom coupling hole 118;118' of the base frame block 11;11' (see FIG. 14). The diameter of the big diameter portion 1231 is greater than the diameter of the coupling axle 221 of each front wheel holder 22. The diameter of the small diameter portion 1232 is smaller than the diameter of the coupling axle 221 of each front wheel holder 22, and engageable with the neck 2211 of the coupling axle 221 (see FIG. 13).

During installation, attach the locating grooves 111;111' of the base frame blocks 11;11' of the front wheel holder mounting frame assemblies 1;1' to the outer side 2111 of the sidebar 211/trailer bar holder 217 of the bottom frame unit 21 and the respective inner sides of the respective sub-sidebars 2110 of the bottom frame unit 21 respectively, and then fastened the respective locating holes 112;112' to the respective sidebars 211 of the bottom frame unit 21 by the respective fastening members 10;10', and then attach the respective spring members 13 to the support rods 122 of the respective control members 12, and then insert the respective control members 12 with the respective spring members 13 into the accommodation open chambers 114;114' of the base frame blocks 11;11' of the respective front wheel holder mounting frame assemblies 1;1', and then pivotally connect the respective control members 12 to the respective base frame blocks 11;11' with the respective pivot pin 125;125'.

Figure 13:
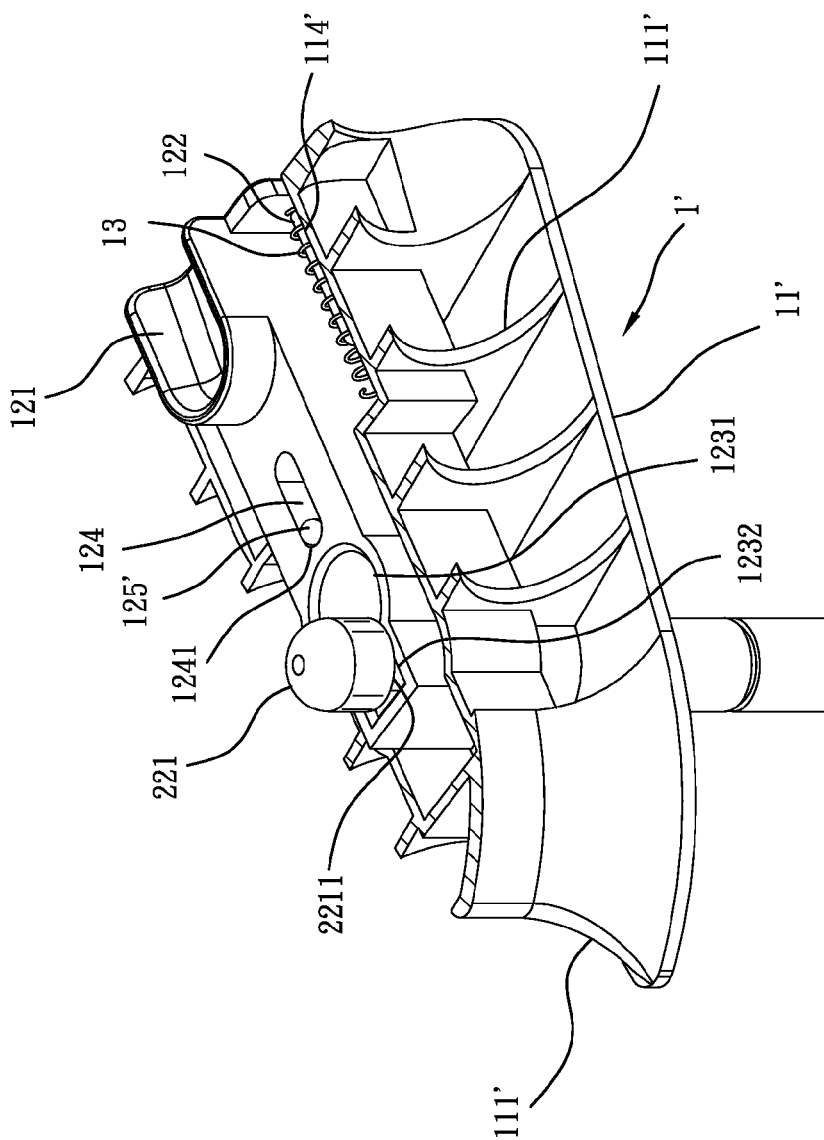
FIG. 13 is a sectional elevational view, in an enlarged scale, of FIG. 12.
Figure 14:
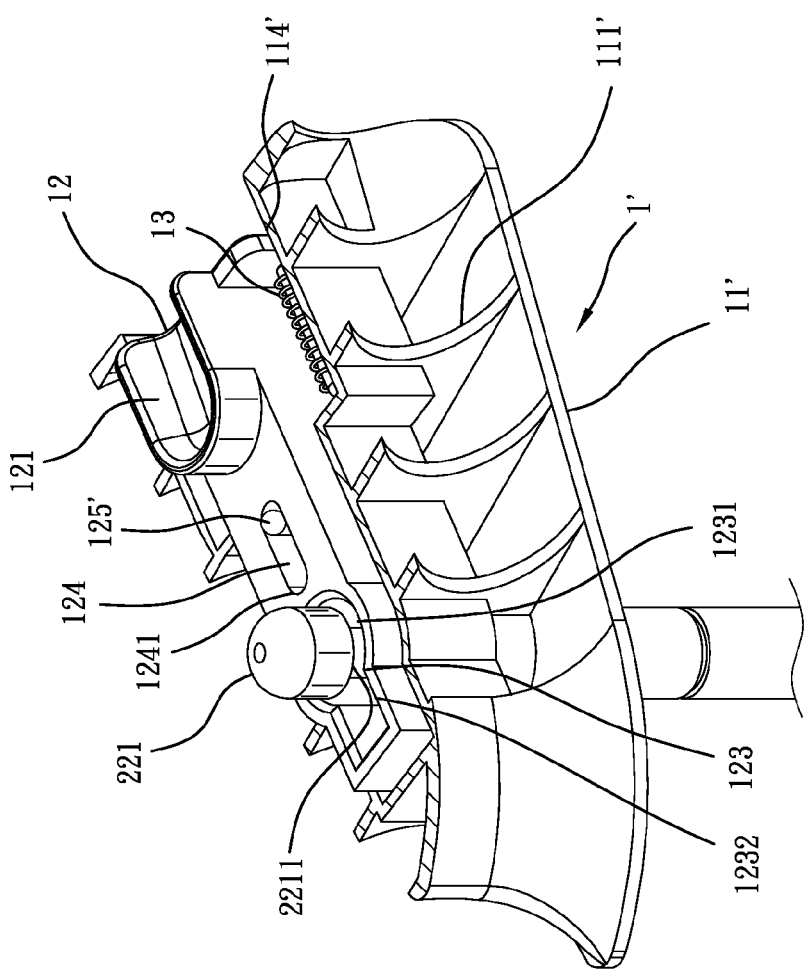
FIG. 14 corresponds to FIG. 13, illustrating the control member pressed.

Further, when connecting the coupling axles 221 of the front wheel holders 22 to the front wheel holder mounting frame assemblies 1;1', push the respective control members 12 forwards to compress the respective spring members 13 (see FIG. 13) to the position where the rear ends 1241 of the sliding slots 124 of the respective control members 12 are respectively stopped by the respective pivot pin 125;125' (see FIG. 14), the big diameter portions 1231 of the positioning holes 123 of the respective control members 12 are respectively kept in axial alignment between the top coupling holes 116;116' and bottom coupling holes 118;118' of the respective base frame blocks 11;11' (see FIG. 14), and then insert the coupling axles 221 of the respective front wheel holders 22 in proper order through the bottom coupling holes 118;118' of the respective base frame blocks 11;11', the big diameter portions 1231 of the positioning holes 123 of the respective control members 12 and the top coupling holes 116;116' of the respective base frame blocks 11;11', and then release the pressure from the respective control members 12 for enabling the respective spring members 13 to return the respective control members 12 (see FIG. 13). At this time, the small diameter portions 1232 of the positioning holes 123 of the respective control members 12 are respectively forced into engagement with the necks 2211 of the coupling axles 221 of the respective front wheel holders 22 (see FIG. 13), locking the respective front wheel holders 22 to the base frame blocks 11;11' of the respective front wheel holder mounting frame assemblies 1;1'. On the contrary, when dismounting the front wheel holders 22, push the control members 12 forwardly to disengage the small diameter portions 1232 of the positioning holes 123 of the respective control members 12 from the necks 2211 of the coupling axles 221 of the respective front wheel holders 22 (see FIG. 14) and to let the rear ends 1241 of the sliding slots 124 of the respective control members 12 be respectively stopped by the respective pivot pin 125;125'. At this time, the big diameter portions 1231 of the positioning holes 123 of the respective control members 12 are respectively kept in axial alignment between the top coupling holes 116;116' and bottom coupling holes 118;118' of the respective base frame blocks 11;11' (see FIG. 14), allowing removal of the coupling axles 221 of the front wheel holders 22 from the base frame blocks 11;11' of the respective front wheel holder mounting frame assemblies 1;1'.

Further, the locating grooves 111;111' of the base frame blocks 11;11' of the front wheel holder mounting frame assemblies 1;1' are respectively configured to fit the outer side 2111 of the (the left) sidebar 211 and trailer bar holder 217 of the bottom frame unit 21 and the inner side of the respective sub-sidebars 2110 of the bottom frame unit 21. According to this embodiment, the locating grooves 111;111' are smoothly arched grooves fitting the smoothly arched configuration of the outer side 2111 of the (the left) sidebar 211 and trailer bar holder 217 of the bottom frame unit 21 and the inner side of the respective sub-sidebars 2110 of the bottom frame unit 21.

Figure 15:
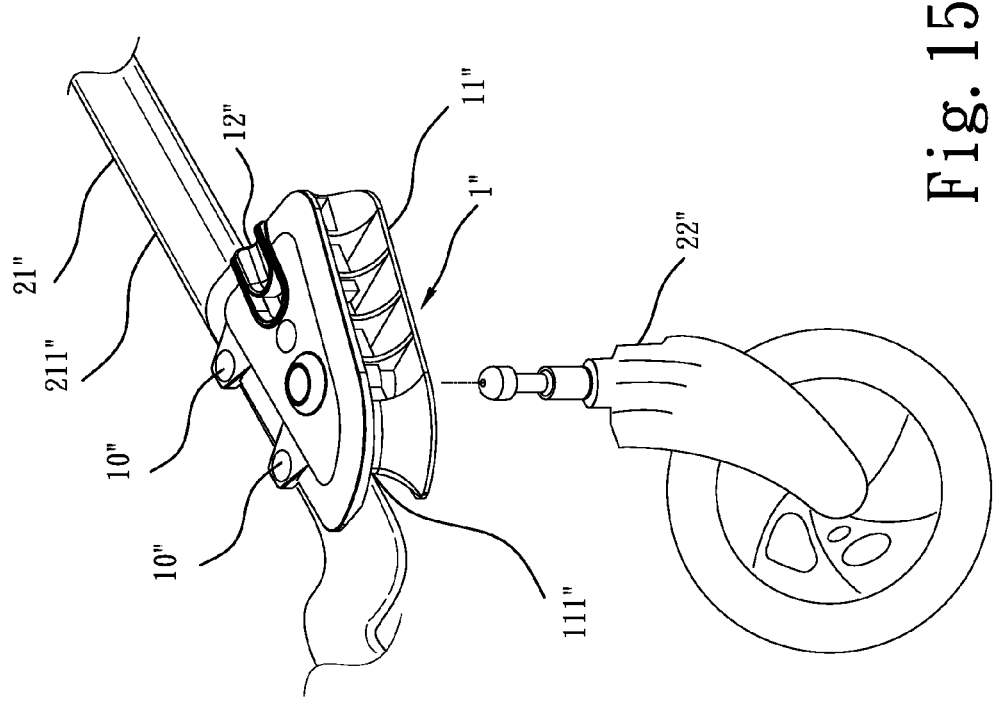
FIG. 15 is an exploded view of a part of a baby trailer frame mounting structure in accordance with a second embodiment of the present invention.

FIG. 15 is an exploded view of a part of a baby trailer frame mounting structure in accordance with a second embodiment of the present invention. According to this second embodiment, the baby trailer eliminates the aforesaid sub-sidebars. Further, the base frame block 11" of the front wheel holder mounting frame assemblies 1" comprises multiple locating holes (not shown) for mounting. During installation, one locating groove 111" of the base frame block 11" of the front wheel holder mounting frame assemblies 1" is attached to the outer side 2111 of the associating sidebar 211" of the bottom frame unit 21", and then the locating holes (not shown) of the base frame block 11" are fastened to the sidebar 211" of the bottom frame unit 21" by respective fastening members 10".

Figure 16:
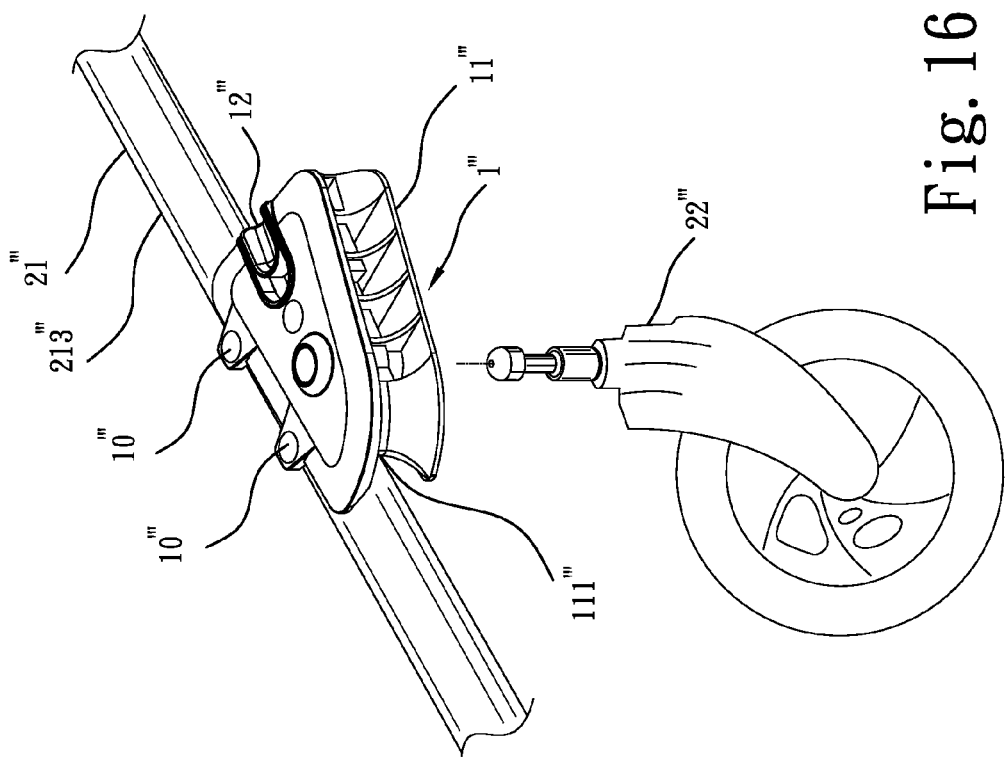
FIG. 16 is an exploded view of a part of a baby trailer frame mounting structure in accordance with a third embodiment of the present invention.

FIG. 16 is an exploded view of a part of a baby trailer frame mounting structure in accordance with a third embodiment of the present invention. According to this third embodiment, one single front wheel holder mounting frame assembly 1''' is used and installed in the front bar 213''' of the bottom frame unit 21'''. Further, the base frame block 11''' of the front wheel holder mounting frame assemblies 1''' comprises multiple locating holes (not shown) for mounting. During installation, one locating groove 111'– of the base frame block 11''' of the front wheel holder mounting frame assemblies 1''' is attached to the front bar 213''' of the bottom frame unit 21''', and then the locating holes (not shown) of the base frame block 11''' are fastened to the front bar 213''' of the bottom frame unit 21''' by respective fastening members 10'''.

In conclusion, the invention provides a baby trailer frame mounting structure, which has the advantages and features as follows:

1. Easy installation with fewer component parts: The design of the locating grooves 111;111' of the base frame blocks 11;11' of the front wheel holder mounting frame assemblies 1;1' facilitates fixation of the front wheel holder mounting frame assemblies 1;1' to the sidebars 211 or front bar 213 of the bottom frame unit 21 with fastening members 10;10'; by means of attaching the respective spring members 13 to the support rods 122 of the respective control members 12 and then inserting the respective control members 12 with the respective spring members 13 into the accommodation open chambers 114;114' of the base frame blocks 11;11' of the respective front wheel holder mounting assemblies 1;1', and then pivotally connecting the base frame blocks 11;11' and the control members 12 to the bottom frame unit 21 with pivot pins 125; 125', the front wheel holder mounting assemblies 1;1' are installed in the bottom frame unit 21 with less labor and time.
2. Simple structural design: Subject to the arrangement of the base frame blocks 11;11', the control members 12, the spring members 13, the fastening members 10;10' and the pivot pins 125;125', the front wheel holders 22 can easily and detachably installed in the bottom frame unit 21 of the baby trailer 2. These component parts are easy and inexpensive to manufacture, thereby reducing the tooling cost.
3. The front wheel holder mounting frame assembly of the baby trailer frame mounting structure has a small size design, saving much storage and delivery space and cost.

What is claimed is:
1. A baby trailer frame mounting structure, comprising:
a bottom frame unit comprising a front bar, a rear bar, two opposing sidebars connected in parallel between said front bar and said rear bar, two sub-sidebars respectively connected between said sidebars and said front bar, two rear wheel holders respectively affixed to said sidebars near said rear bar and adapted to pivotally support one respective rear wheel, a trailer bar holder affixed to one said sidebar near said front bar for the mounting of a trailer bar;
a top frame unit having opposing front and rear ends of opposing left and right sides thereof respectively coupled to front and rear ends of said sidebars of said bottom frame unit;

a trailer bar having a rear end thereof pivotally connected to said trailer bar holder of said bottom frame unit and a front end thereof connectable to a rear part of a frame structure of a bicycle;

two front wheel holder mounting frame assemblies respectively and selectively connected to said sidebars or said front bar of said bottom frame unit for the connection of one respective front wheel holder; and two front wheel holders each comprising a coupling axle respectively pivotally coupled to said front wheel holder mounting frame assemblies and pivotally supporting one respective front wheel, said coupling axle having a neck near a top end thereof;

wherein:

said front wheel holder mounting frame assemblies each comprises:

a base frame block, said base frame block comprising a locating groove located on each of two opposite lateral sides thereof, a locating hole disposed at one lateral side thereof and extending across one said locating groove and respectively fastened to said sidebars of said bottom frame unit by a respective fastening member, an accommodation open chamber extending to a rear side thereof, a top through hole and a top coupling hole respectively located on a top side thereof in communication with said accommodation open chamber, a bottom through hole and a bottom coupling hole respectively located on a bottom side thereof in communication with said accommodation open chamber, and a locating notch located on the top side and extending to the rear side, the locating grooves of the base frame block of one said front wheel holder mounting frame assembly being respectively attached to one said sidebar of said bottom frame unit the associating sub-sidebar, the locating grooves of the base frame block of the other said front wheel holder mounting frame assembly being respectively attached to said trailer bar holder of said bottom frame unit and the associating sub-sidebar;

at least one spring member; and a control member inserted into said accommodation open chamber of said base frame block and pivotally connected to said base frame block for locking the coupling axle of one said front wheel holder to said base frame block, said control member comprising a rear stop block suspending in said locating notch, at least one support rod disposed adjacent to said rear stop block and extending forwards and supporting said at least one spring member, a positioning hole disposed at a front side thereof, and a sliding slot spaced between said at least one support rod and said positioning hole and coupled to said top through hole and bottom through hole of said base frame block by a pivot pin, said control member being movable forwards relative to said base frame block to compress said at least one spring and automatically returnable to the former position thereof by said at least one spring member when the applied pressure is disappeared.

2. The baby trailer frame mounting structure as claimed in claim 1, wherein said positioning hole comprises a big diameter portion and a small diameter portion, the diameter of said big diameter portion being greater than the diameter of the coupling axle of each said front wheel holder, the diameter of said small diameter portion being smaller than the diameter of the coupling axle of each said front wheel holder and engageable with the neck of the coupling axle of the associating front wheel holder.

3. The baby trailer frame mounting structure as claimed in claim 1, wherein the locating grooves of the base frame block of each said front wheel holder mounting frame assembly are smoothly arched, fitting the configuration of said sidebar and the configuration of said trailer bar holder of said bottom frame unit and the configuration of said sub-sidebars.

4. A baby trailer frame mounting structure, comprising:

a bottom frame unit comprising a front bar, a rear bar, two opposing sidebars connected in parallel between said front bar and said rear bar, two rear wheel holders respectively affixed to said sidebars near said rear bar and adapted to pivotally support one respective rear wheel, a trailer bar holder affixed to one said sidebar near said front bar for the mounting of a trailer bar;

a top frame unit having opposing front and rear ends of opposing left and right sides thereof respectively coupled to front and rear ends of said sidebars of said bottom frame unit;

a trailer bar having a rear end thereof pivotally connected to said trailer bar holder of said bottom frame unit and a front end thereof connectable to a rear part of a frame structure of a bicycle;

two front wheel holder mounting frame assemblies respectively and selectively connected to said sidebars or said front bar of said bottom frame unit for the connection of one respective front wheel holder; and two front wheel holders each comprising a coupling axle respectively pivotally coupled to said front wheel holder mounting frame assemblies and pivotally supporting one respective front wheel, said coupling axle having a neck near a top end thereof;

wherein:

said front wheel holder mounting frame assemblies each comprises:

a base frame block, said base frame block comprising a locating groove located on one lateral sides, a locating hole disposed at the said lateral side thereof and extending across the said locating groove and fastened to right sidebars of said bottom frame unit by a fastening member, a locating hole disposed at the said lateral side thereof and extending across the said locating groove and fastened to left sidebars of said bottom frame unit by a fastening member, an accommodation open chamber extending to a rear side thereof, a top through hole and a top coupling hole respectively located on a top side thereof in communication with said accommodation open chamber, a bottom through hole and a bottom coupling hole respectively located on a bottom side thereof in communication with said accommodation open chamber, and a locating notch located on the top side and extending to the rear side, the locating grooves of the base frame block of one said front wheel holder mounting frame assembly being respectively attached to one said sidebar of said bottom frame unit the associating sub-sidebar, the locating grooves of the base frame block of the other said front wheel holder mounting frame assembly being respectively attached to said trailer bar holder of said bottom frame unit and the associating sub-sidebar;

at least one spring member; and a control member inserted into said accommodation open chamber of said base frame block and pivotally connected to said base frame block for locking the coupling axle of one said front wheel holder to said base frame block, said control member comprising a rear stop block suspending in said locating notch, at least one support rod disposed adjacent to said rear stop block and extending forwards and supporting said at least one spring member, a positioning hole disposed at a front side thereof, and a sliding slot spaced between said at least one support rod and said positioning hole and coupled to said top through hole and bottom through hole of said base frame block by a pivot pin, said control member being movable forwards relative to said base frame block to compress said at least one spring and automatically returnable to the former position thereof by said at least one spring member when the applied pressure is disappeared.

5. The baby trailer frame mounting structure as claimed in claim 4, wherein said positioning hole comprises a big diameter portion and a small diameter portion, the diameter of said big diameter portion being greater than the diameter of the coupling axle of each said front wheel holder, the diameter of said small diameter portion being smaller than the diameter of the coupling axle of each said front wheel holder and engageable with the neck of the coupling axle of the associating front wheel holder.

6. The baby trailer frame mounting structure as claimed in claim 4, wherein the locating grooves of one side of the base frame block of each said front wheel holder mounting frame assembly are smoothly arched, fitting the configuration of said sidebar and the configuration of said trailer bar holder of said bottom frame unit and the configuration of said sub-sidebars.

7. A baby trailer frame mounting structure, comprising:
a bottom frame unit comprising a front bar, a rear bar, two opposing sidebars connected in parallel between said front bar and said rear bar, two rear wheel holders respectively affixed to said sidebars near said rear bar and adapted to pivotally support one respective rear wheel, a trailer bar holder affixed to one said sidebar near said front bar for the mounting of a trailer bar;
a top frame unit having opposing front and rear ends of opposing left and right sides thereof respectively coupled to front and rear ends of said sidebars of said bottom frame unit;
a trailer bar having a rear end thereof pivotally connected to said trailer bar holder of said bottom frame unit and a front end thereof connectable to a rear part of a frame structure of a bicycle;
a front wheel holder mounting frame assemblies connected to said sidebars or the middle part of said front bar of said bottom frame unit for the connection of one front wheel holder; and
a front wheel holders each comprising a coupling axle pivotally coupled to said front wheel holder mounting frame assemblies and pivotally supporting one front wheel, said coupling axle having a neck near a top end thereof;
wherein:
said front wheel holder mounting frame assemblies each comprises:
a base frame block, said base frame block comprising a locating groove located on one lateral side, one or more locating holes disposed at the lateral side thereof and extending across the said locating groove and fastened to the middle part of said sidebars of said bottom frame unit by a respective fastening member, an accommodation open chamber extending to a rear side thereof, a top through hole and a top coupling hole respectively located on a top side thereof in communication with said accommodation open chamber, a bottom through hole and a bottom coupling hole respectively located on a bottom side thereof in communication with said accommodation open chamber, and a locating notch located on the top side and extending to the rear side, the locating grooves of the base frame block of one said front wheel holder mounting frame assembly being respectively attached to one said sidebar of said bottom frame unit the associating sub-sidebar, the locating grooves of the base frame block of the other said front wheel holder mounting frame assembly being respectively attached to said trailer bar holder of said bottom frame unit and the associating sub-sidebar;
at least one spring member; and
a control member inserted into said accommodation open chamber of said base frame block and pivotally connected to said base frame block for locking the coupling axle of one said front wheel holder to said base frame block, said control member comprising a rear stop block suspending in said locating notch, at least one support rod disposed adjacent to said rear stop block and extending forwards and supporting said at least one spring member, a positioning hole disposed at a front side thereof, and a sliding slot spaced between said at least one support rod and said positioning hole and coupled to said top through hole and bottom through hole of said base frame block by a pivot pin, said control member being movable forwards relative to said base frame block to compress said at least one spring and automatically returnable to the former position thereof by said at least one spring member when the applied pressure is disappeared.

8. The baby trailer frame mounting structure as claimed in claim 7, wherein said positioning hole comprises a big diameter portion and a small diameter portion, the diameter of said big diameter portion being greater than the diameter of the coupling axle of each said front wheel holder, the diameter of said small diameter portion being smaller than the diameter of the coupling axle of each said front wheel holder and engageable with the neck of the coupling axle of the associating front wheel holder.

9. The baby trailer frame mounting structure as claimed in claim 7, wherein the locating grooves of the base frame block of each said front wheel holder mounting frame assembly are smoothly arched, fitting the configuration of the middle part of said sidebar.

* * * * *